Nov. 10, 1970  J. S. SWEENEY ET AL  3,539,696

REAL-TIME DYNAMIC PERSPECTIVE DISPLAY

Filed April 1, 1968  5 Sheets-Sheet 2

INVENTORS
JAMES S. SWEENEY
CHARLES P. GREENING

BY

ATTORNEY

Nov. 10, 1970  J. S. SWEENEY ET AL  3,539,696

REAL-TIME DYNAMIC PERSPECTIVE DISPLAY

Filed April 1, 1968  5 Sheets-Sheet 5

INVENTORS
JAMES S. SWEENEY
CHARLES P. GREENING
BY

ATTORNEY

United States Patent Office 3,539,696
Patented Nov. 10, 1970

---

3,539,696
REAL-TIME DYNAMIC PERSPECTIVE DISPLAY
James S. Sweeney, Laguna Beach, and Charles P. Greening, Fullerton, Calif., assignors to North American Rockwell Corporation
Filed Apr. 1, 1968, Ser. No. 717,491
Int. Cl. G09b 29/10
U.S. Cl. 35—10.2   7 Claims

ABSTRACT OF THE DISCLOSURE

A real-time dynamic perspective display of the terrain below an aircraft is derived from a contour map color-coded using three colors. An optical scanning device is programmed to scan the map along a predetermined pattern to generate a continuous series of profiles along successive slices of terrain. The profiles are transformed to derive the instantaneous bearing and altitude angles of points on the terrain as the map is scanned. The instantaneous values of the bearing and altitude angles are converted into X and Y coordinates and displayed on a conventional display surface. Apparatus is provided to suppress profile lines which are lower than previous profile lines which the observer would normally not see in an actual view of the terrain.

BACKGROUND OF THE INVENTION

Field of the invention

The present invention relates to information displays and, more particularly, to apparatus for deriving, from a contour map, a real-time dynamic perspective display of the terrain on the map.

Description of the prior art

The increase in military use of aircraft together with the increased speeds of modern fighter, bomber and reconnaisance aircraft have significantly increased the requirements of the information sources needed by a pilot to fly the aircraft. One situation where this is the case is in the navigation of an aircraft over a planned route. The most common technique used for navigation is a simple contour map. When flying at high altitudes, such maps do not present a serious problem because the terrain below looks substantially flat and a trained pilot can correlate his view of the terrain with the contour map. However, when flying at low level, the problem is significantly more severe. At low altitudes, the contours of the terrain become readily observable while the relationships among surface features become distorted by perspective. This places a significant demand on the ability of the pilot to make the required coordinate conversion from the hollows, ridges and other terrain contours that he sees to the contour lines and other features on a conventional map. In fact, it has been shown that when flying at low level, especially at high speeds, it is practically impossible for the pilot to make the necessary conversion between the contour map and the terrain.

Another situation in which stringent demands are made on the requirements of a display system is in conditions of bad weather causing low or no visibility. In such a situation, it is desirable to provide the pilot with a display which simulates that which he would visualize if he were able to view the terrain in front of the aircraft. One proposed system uses a forward-looking monopulse radar which scans the terrain in front of the aircraft at increasingly greater ranges and provides a display which consists of a series of profiles where increasing range is indicated by varying shades of gray. Although operative, such a system has a serious limitation in that an active radar system, which is constantly operating, is required. This is often undesirable in hostile environments since the radar transmissions may be detected to warn of the approach of the aircraft.

Still another situation where significant demands are made on display requirements is in the training of pilots where it is desirable to simulate a view of the terrain for a trainee in a simulator. One possible technique that is used is to fly an aircraft over the terrain and take a motion picture of it. This motion picture is then projected in front of the trainee in the simulator while the motion of the simulator is controlled in accordance with the motion of the aircraft which took the picture. This has the serious disadvantage that the display that the trainee sees is not responsive to the manipulaion that he may make of the controls in the simulator. In order to eliminate this disadvantage, it has been proposed to provide a digital computer which can take a standard contour map, divide it into units and store all of the units. The digital computer can then be made to display that which is on the contour map as a function of the manipulations of the aircraft that the trainee in the simulator may make. However, this approach has the serious disadvantage that the digital computer requires a significantly large memory capacity. In addition, the apparatus required to have the digital computer provide information as a function of the manipulation of the simulated aircraft is extremely complex.

Another technique used to simulate a view of the terrain in front of an aircraft for a trainee in a simulator is to build a detailed three-dimensional model of the terrain and slave a television camera on a carriage to the simulated aircraft controls. The serious disadvantage of this technique is the labor involved in constructing detailed terrain models of large areas.

In all three of these situations, what is reqiured is a real-time dynamic perspective display of the terrain in front of the aircraft which will closely and accurately simulate that which the pilot would see if he were to view the terrain directly. In the case of low level navigation, such a display will permit the pilot to readily correlate the real world with his flight plan as shown on a standard contour map. In conditions of poor visibility, such a display used with an adequate navigation system will provide the pilot with the information required to steer the aircraft or, in combination with other electronic terrain avoidance equipment, will give the pilot additional confidence in the information provided. Finally, where it is required to simulate the view of terrain for training purposes, such a display will provide an accurate and responsive representation thereof.

SUMMARY OF THE INVENTION

According to the present invention, there is provided such a real-time dynamic perspective display of the terrain in front of an aircraft. The display is derived directly from a contour map, thereby eliminating the requirement for an active sensor such as a forward-looking radar. The display has the property that it shows the earth in a perspective view which is appropriate to the present location and direction of the aircraft carrying the display. As the aircraft moves, turns or changes altitude, the display reflects the changes in real time. The advantages of such a display over conventional fixed or moving contour maps are obvious. The conversion of a standard contour map into a three-dimensional perspective display obviously aids terrain recognition since terrain features are more readily discerned. In addition, in such a display, the coordinates correspond precisely with those of direct vision or indirect perspective sensor systems such as television. Finally, altitude and attitude changes are immediately apparent from the display.

According to the present invention, a standard contour map is color-coded using three colors, i.e., clear, gray and black. An optical scanning device is programmed to scan the map along a simple pattern to provide a continuous series of profiles from an initial point corresponding to the position of the aircraft. An arithmetic coordinate conversion computation is performed to derive a pair of signals corresponding to the instantaneous bearing and altitude angles of corresponding points on the terrain as the map is scanned. These two signals are further converted into signals in an X and Y coordinate system and displayed in such a way that the distance from and altitude above any point on the terrain is reflected in the displayed position of that point. In addition, apparatus is provided to suppress profile lines which are lower than previous profile lines which the observer would normally not see in an actual view of the terrain.

OBJECTS

It is, therefore, an object of the present invention to provide a real-time dynamic perspective display of the terrain in front of an aircraft.

It is a further object of the present invention to provide such a display which is derived from a contour map.

It is a still further object of the present invention to provide such a display derived from a contour map which is color-coded and optically scanned.

It is another object of the present invention to provide a real-time dynamic perspective display made up of a series of profile lines in which profile lines which are lower than a closer profile line are blanked out.

It is still another object of the present invention to provide a display which has the property of showing the terrain in front of an aircraft in a perspective view appropriate to the present location of the aircraft carrying the display.

Another object of the present invention is the provision of a real-time dynamic perspective display of the terrain in front of an aircraft which is completely responsive to the movements of the aircraft carrying the display.

BRIEF DESCRIPTION OF THE DRAWINGS

Still other objects, features and attendant advantages of the present invention will become apparent to those skilled in the art from a reading of the following detailed description of the preferred embodiment constructed in accordance therewith taken in conjunction with the accompanying drawings wherein like numerals desigate like parts in the several figures and wherein:

FIG. 1b is a profile of the terrain taken along line A-B in FIG. 1a;

DESCRIPTION OF THE PREFERRED EMBODIMENT

Figure 1A:
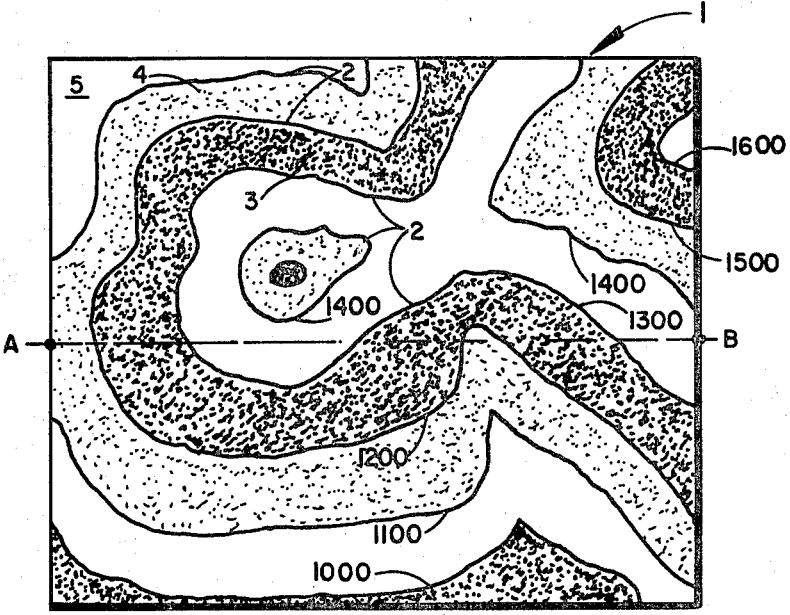
FIG. 1a shows a standard contour map color-coded in accordance with the teachings of the present invention.

Referring now to the drawings and, more particularly, to FIG. 1a thereof, there is shown a standard contour map 1 made up of a series of equi-altitude lines 2 which are either closed or which terminate at the edge of map 1. For any such line, the terrain on one side is necessarily higher than that on the other, throughout the length of the line. Hence, a ribbon of terrain, such as ribbons 3, 4 and 5, characterized by a certain altitude range, exists on each side of a contour line. Each such ribbon of terrain is bounded on its other side by another contour line on the edge of map 1.

Assume an index altitude such as 1,000 feet in FIG. 1a. According to the present invention, the ribbon of terrain on the up-hill side of this contour, wherever it occurs, is color-coded. In the present example, the color chosen is clear. The next higher ribbon can be colored everywhere gray and the next higher, black. The next higher ribbon of terrain will again be colored clear and this sequence can be repeated indefinitely in both directions. In this manner, all steps up in altitude are characterized by a single level change in the darker direction, or a two level change from black to clear. All steps down in altitude are characterized by a single level change in the lighter direction, or a two-level change from clear to black.

Next assume an optical scanning device which can move across map 1. The changes in value can be interpreted as follows:

TABLE 1

| State 1 | State 2 | Change in altitude |
|---|---|---|
| Clear | Clear | 0 |
| Do | Gray | +100 |
| Do | Black | −100 |
| Gray | Clear | −100 |
| Do | Gray | 0 |
| Do | Black | +100 |
| Black | Clear | +100 |
| Do | Gray | −100 |
| Do | Black | 0 |

Thus, for any change in color value, an unequivocal altitude change can be assumed. If such an optical scanning device were to move from point A to point B in FIG. 1a, the states and corresponding altitude changes will be as follows:

TABLE 2

| State No. | Color | Altitude change |
|---|---|---|
| 1 | Gray | None |
| 2 | Black | +100 |
| 3 | Clear | +100 |
| 4 | Black | −100 |
| 5 | Gray | −100 |
| 6 | Black | +100 |
| 7 | Clear | +100 |

Figure 1B:
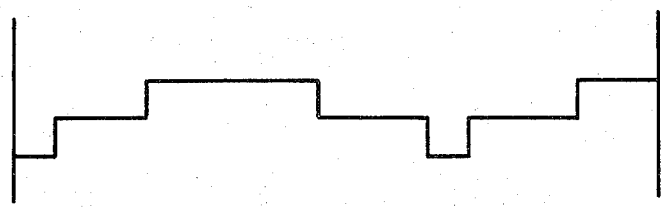

The corresponding profile will be as shown in FIG. 1b.

Figure 1C:
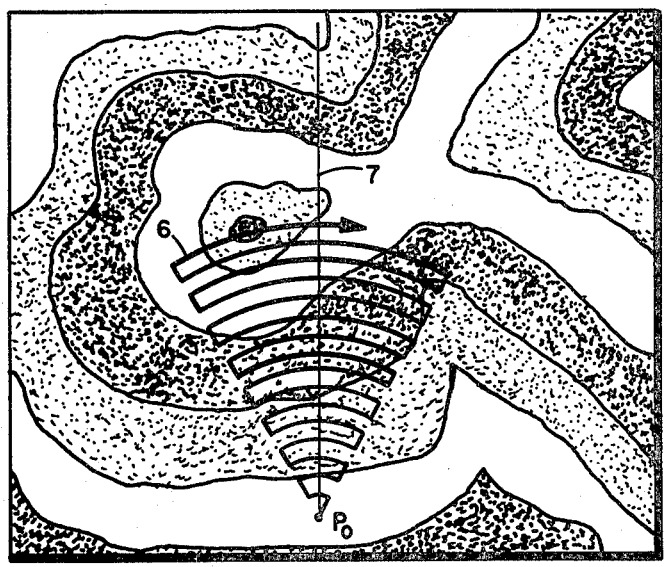
FIG. 1c is a contour map showing a scan pattern which may be used to generate a perspective display.

If the optical scanning device is programmed to make a simple pattern which scans back and forth across the terrain at constantly advancing positions from a point $P_0$ representing present aircraft position, a continuous series of profiles can be made from such initial point covering the area as closely as desired. In addition, the output of the scanning device may be used to generate a closely spaced series of profiles across parallel or near parallel slices of the terrain as will be explained more fully hereinafter. An example of a simple pattern 6 which may be used to scan map 1 to provide a display in accordance with the teachings of the present invention is shown in FIG. 1c. Such a pattern may be derived by scanning in a polar coordinate system along arcuate paths between two lines defined by the angles $+\theta_m$ and $-\theta_m$ measured with respect to the aircraft boresight line 7. At the end of each angular scan, the position of the scanning beam is moved away from point $P_0$ by a fixed amount $\Delta R$.

Figure 2:
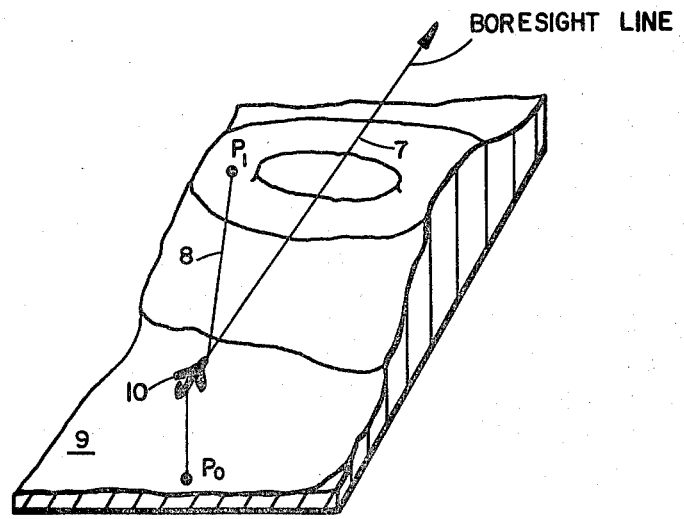
FIG. 2 is a simplified view of a portion of the terrain over which an aircraft might fly which assists in defining the geometry of the present perspective display.
Figure 3:
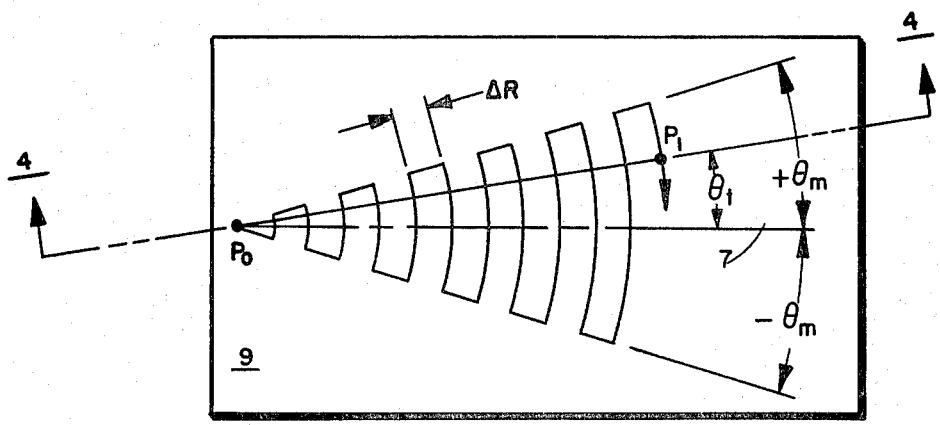
FIG. 3 is a plan view of the terrain of FIG. 2 showing the scan pattern used in the preferred embodiment.
Figure 4:
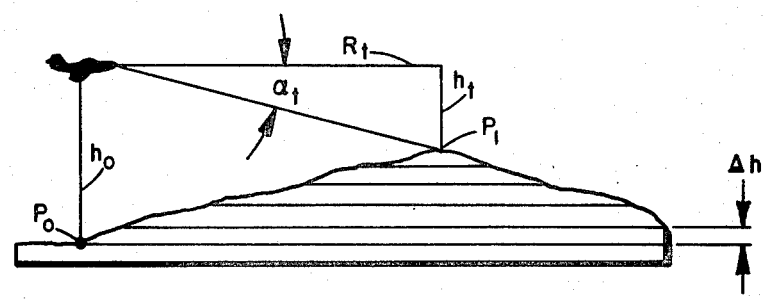
FIG. 4 is a view taken along lines 4—4 in FIG. 3.

In order to provide a perspective display of the terrain, it is necessary to transform the coordinates of the continuous series of profiles in such a way that the distance from and altitude above any point in the terrain is reflected in the displayed position of that point. Referring now to FIGS. 2–4, assume an aircraft 10 having an instantaneous position $P_o$ and a boresight line 7 travelling over a portion of terrain 9. At any instant of time, any point $P_1$ on the terrain ahead of aircraft 10 may be described by the angles $\theta_t$ and $\alpha_t$, the former being the deviation in a horizontal plane between boresight line 7 and a line 8 connecting aircraft 10 and point $P_1$ and the latter being the deviation in a vertical plane between boresight line 7 and line 8.

Referring to FIGS. 3 and 4, it can be seen that the angles $\theta_t$ and $\alpha_t$ are defined as follows:

$$\theta_t = \theta_s, \text{ and} \quad (1)$$

$$\alpha_t = \tan^{-1}\left[\frac{h_t}{R_t}\right] = \tan^{-1}\left[\frac{h_o - \Sigma \Delta h}{\Sigma \Delta R}\right] \quad (2)$$

where $\theta_s$=the instantaneous angular position of the optical scanning device. In order to generate $\theta_t$ and $\alpha_t$, the quantities on the right of Equations 1 and 2 must be determined. The sources of this information may be as follows:

$\theta_s$—Directly from the output of the optical map reader drive;
$h_o$—From the aircraft altimeter (or a preset altitude);
$\Delta h$—Preset from the map contour interval;
$\Sigma \Delta h$—The algebraic sum of the $\Delta h$ steps detected during the scan;
$\Delta R$—Preset;
$\Sigma \Delta R$—Directly from the output of the optical map reader drive;
$R_t = \Sigma \Delta R = R_s$; and
$h_t = h_o - \Sigma \Delta h$.

Figure 5:
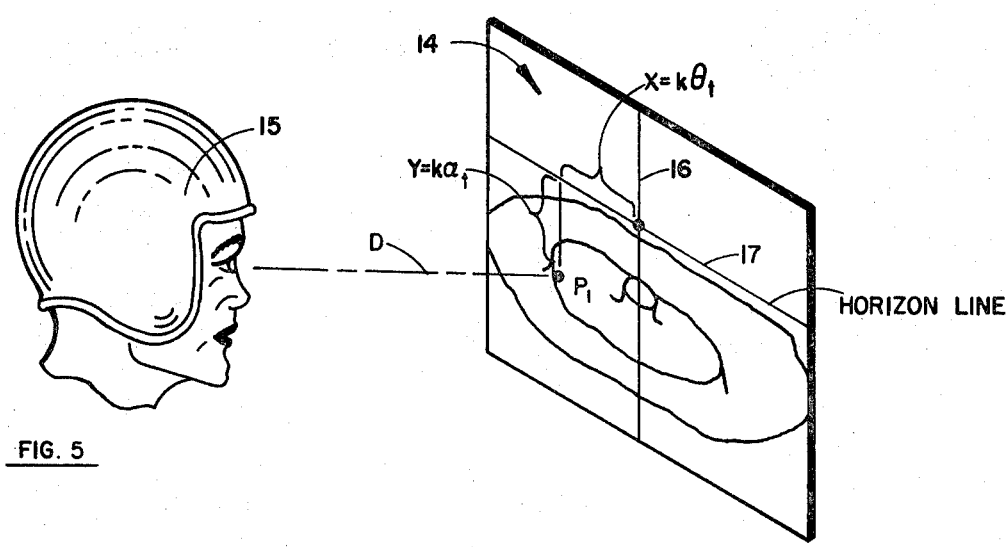
FIG. 5 is a schematic view of a display surface and its relationship to an observer.

Referring now to FIG. 5, for the development of a perspective display 14, all that is necessary is that any point on the terrain, such as point $P_1$, which is represented on the display, be presented at such a location that $\theta_t$ and $\alpha_t$ are the same as they are in the real world. If the viewing distance D between an observer 15 and display 14 is large compared to the dimensions of display 14, $k\theta_t$ can be used as the lateral deviation from center line 16 of display 14 and $k\alpha_t$ as the vertical deviation from a horizon line 17.

Figure 7A:
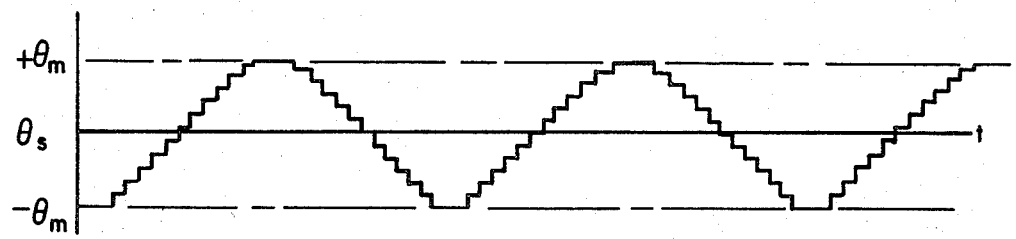
FIGS. 7a–7b are waveforms useful in explaining the operation of the present invention.
Figure 7B:
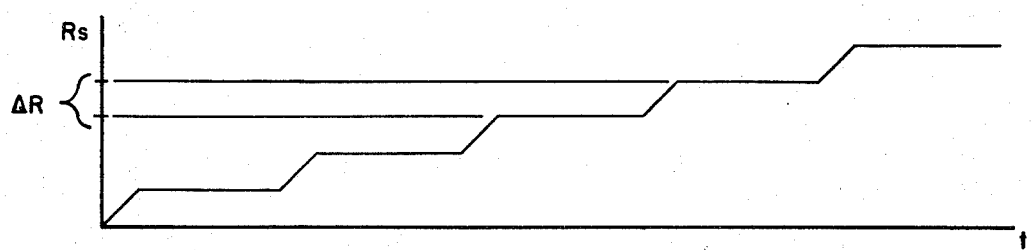
Figure 6:
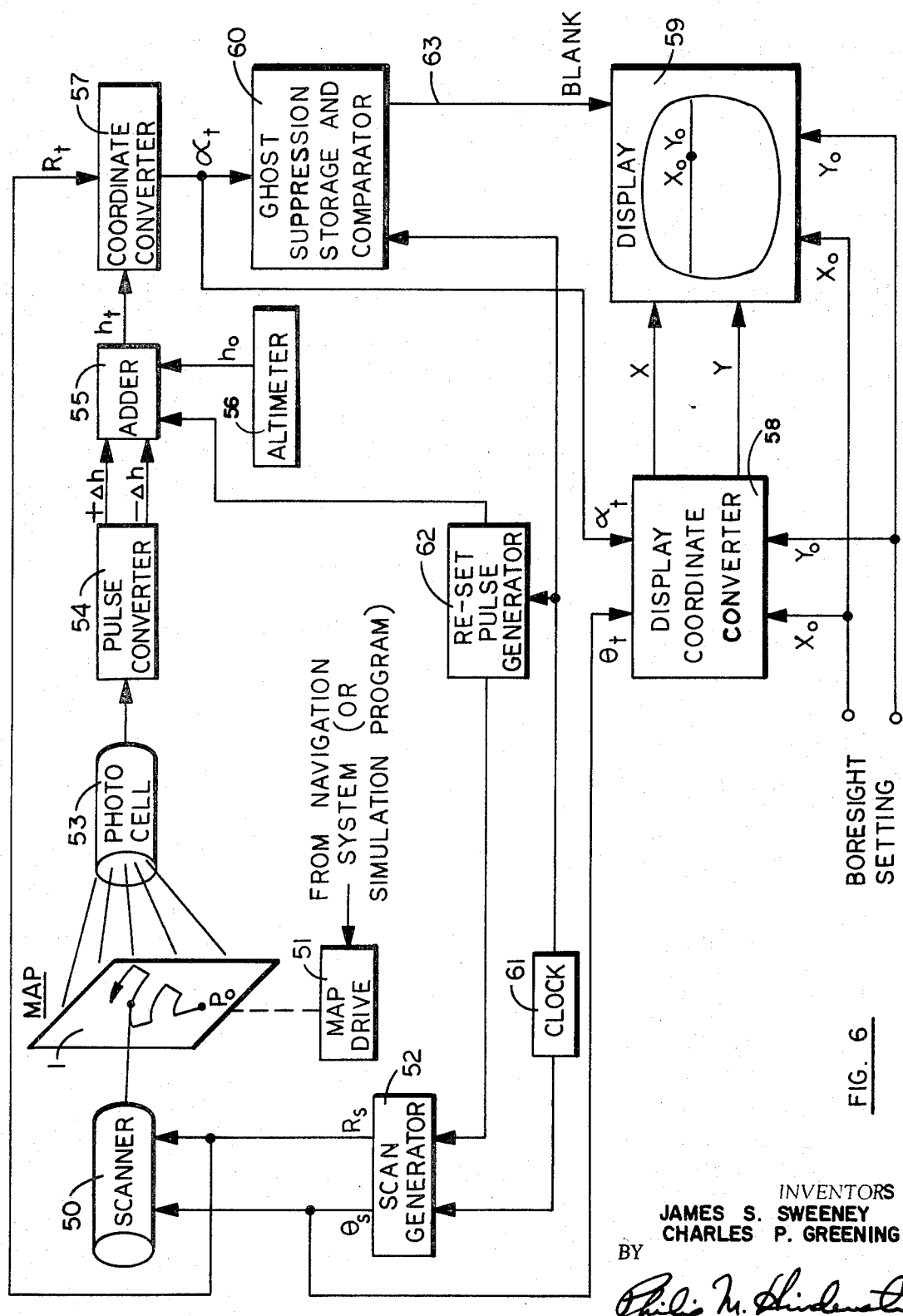
FIG. 6 is a block diagram of a display system constructed in accordance with the teachings of the present invention.

Referring now to FIGS. 6 and 7a–7b, a transparent, three-value map 1, of the type described with respect to FIG. 1a, is held over the surface of a map reader 50 by a three-axis map drive 51. Map reader 50 may be a vidicon, a flying spot scanner or a mechanical drive depending upon the desired speed of operation. Navigation system information or information from a simulation program is provided to map drive 51 in order to position map 1 with the aircraft present location over an index location on scanner 50, map 1 being oriented so that the aircraft heading is fixed across the tube face. A bright spot is driven along the scan pattern on map 1 by a scan generator 52, the outputs of which are shown in FIGS. 7a and 7b. The reason that the $\theta_s$ scan is a step function rather than a smooth sawtooth will become more apparent hereinafter. A photocell 53 is positioned to intercept the light which is transmitted through map 1 and responds with an output which corresponds to one of three levels of opacity of map 1. The output of photocell 53 is applied to a pulse converter 54 which contains logic to convert the three-level output signal from photocell 53 into $+\Delta h$ and $-\Delta h$ signals indicating incremental steps up and down in altitude. The $+\Delta h$ and $-\Delta h$ signals are applied to an adder 55 which receives, as an additional input, a signal $h_o$ from an altimeter 56 representing the altitude of the aircraft above the terrain. Adder 55 combines the $h_o$, $+\Delta h$ and $-\Delta h$ signals to derive $h_t$ in accordance with the relation:

$$h_t = h_o - \Sigma(+\Delta h) + \Sigma(-\Delta h) \quad (3)$$

The $h_t$ signal is applied to a coordinate converter 57 which receives as a second input the $R_s = R_t$ signal from scan generator 52. Coordinate converter 57 operates on $h_t$ and $R_t$ in accordance with Equation 2 to derive $\alpha_t$. The $\alpha_t$ signal is applied to a display coordinate converter 58, together with the $\theta_s = \theta_t$ signal from scan generator 52. Display coordinate converter 58 also receives a pair of adjustable signals $X_o$ and $Y_o$ which define the boresight direction. Display coordinate converter 58 operates on these signals in accordance with the equations:

$$X = X_o + k\theta_t, \text{ and} \quad (4)$$

$$Y = Y_o + k\alpha_t \quad (5)$$

The X and Y signals are applied to the horizontal and vertical inputs, respectively, of a display 59, together with the $X_o$ and $Y_o$ signals which define the position of the boresight. Display 59 may be a graphics plotter for low speed applications or a cathode ray tube for high speed applications. The $\alpha_t$ output of coordinate converter 57 is also applied to a ghost suppression storage and comparator circuit 60, the output of which is applied as a blanking signal to display 59. The purpose of circuit 60 will be explained more fully hereinafter.

The basic synchronization of all elements is controlled by a master clock 61 which generates a train of pulses of fixed interval to control scan generator 52, a re-set pulse generator 62 and ghost suppression storage and comparator 60. Re-set pulse generator 62 counts the pulses from clock 61 and, upon reaching a count which is representative of the end of a complete scan, generates a signal to re-set scan generator 52, adder 55 and ghost suppression storage and comparator 60.

In operation, before take-off or upon flying over a known location at a known altitude on a known heading, contour map 1 must be indexed in the map reader so that the initial conditions are established. Clock 61 then starts scan generator 52 which provides the output shown in FIGS. 7a and 7b to establish the scan pattern shown in FIGS. 1c and 3. Scanner 50 begins reading map 1 at point $P_o$ representing present aircraft position and scans map 1 in a pattern which moves in the direction of the aircraft boresight. The end of the first set of scan lines is at some arbitrary range. This is detected by re-set pulse generator 62 which applies a pulse to scan generator 52 so that scanner 50 comes back to the new aircraft position, which is slightly advanced due to aircraft motion during the first scan, and starts again. Navigation system information, or information from a simulation program, is applied to map drive 51 so that map 1 is always properly positioned in the path of scanner 50. Photocell 53 intercepts the light passing through map 1 and responds with a three-level output signal which is applied to pulse converter 54. The basic concept of the present invention requires that the value of each contour interval be added or subtracted from the previous total. In this manner, a constant indication may be kept of the instantaneous height of the terrain at the point of the scanning beam. Accordingly, the pulse pattern output of photocell 53 is converted to add and subtract pulses by the logic in pulse converter 54 in accordance with the conditions established in Table 1. The add and subtract pulses are applied to an adder 55 which sums the measured incremental changes and subtracts this total from the reference altitude $h_o$ provided by altimeter 56 in accordance with Equation 3 to yield instantaneous terrain height $h_t$ relative to the initial position $P_o$.

Since the only remaining quantity, $R_t$, in Equation 2 is known, i.e., it is identical with the $R_s$ output of scan generator 52, Equation 2 may now be solved for $\alpha_t$. Accordingly, the $h_t$ signal from adder 55 an the $R_t$ signal from scan generator 52 are applied to a coordinate converter 57 which solves for $\alpha_t$. The signal representing altitude angle $\alpha_t$ derived from coordinate converter 57 and the signal representing bearing angle $\theta_t$ derived directly from scan generator 52, are applied to display coordinate converter 58, together with the $X_o$ and $Y_o$ signals which are manually or automatically adjustable to define the boresight direction. Display coordinate converter 58 converts the bearing and altitude angle signals into display coordinates by multiplying these signals by a constant $k$ and summing with the signals $X_o$ and $Y_o$ in accordance with Equations 4 and 5. The X and Y signals are applied to the X and Y drive controls of display 59.

The result is a frame consisting of one perspective view made up of a number of scans across the terrain directly ahead of the aircraft. The frame rate is made high enough that a motion picture effect is achieved responsive to all changes in position, altitude and heading of the craft. The resulting picture for one frame, without smoothing of the terrain features, will resemble that shown in FIG. 8. A smooth frame derived by filtering the X and Y signals might resemble that shown in FIG. 9. Details of the display will depend upon contour interval, map scale, smoothing function, etc.

Ghost suppression storage and comparator block 60 is designed to keep successive profile lines which are lower in altitude than previous profile lines from appearing on the display. As can be seen from FIG. 8, as a profile line is traced across the display, if it encounters another profile line so as to fall behind it, a realistic display requires that the new profile line not be displayed since the observer would not be able to see such a line. To do this, the altitude angle signal $\alpha_t$ from coordinate converter 57 is applied to storage and comparison unit 60 which contains a plurality of storage units, one for each of the steps in the $\theta_s$ scan shown in FIG. 7a. As the $\theta_s$ scan is made, the derived $\alpha_t$ signal is applied to the storage unit for the particular bearing angle under control of a synchronzing signal from clock 61. As the next scan is received, the instantaneous altitude angle $\alpha_t$ for each bearing angle is compared with the stored altitude angle $\alpha_{t_s}$ for that bearing angle. If the incoming signal level is larger than the stored signal level, the new signal is permitted to pass into the storage unit and the $\alpha_t$ signal is displayed on display 59. If the incoming signal level is less than the stored signal level, the incoming signal is inhibited from diminishing the stored signal level and a blanking signal is applied to display 59 over a line 63. In this manner, the stored value remains as before and the values of altitude angles that would indicate an obscured lower altitude are kept from display 59.

Figure 8:
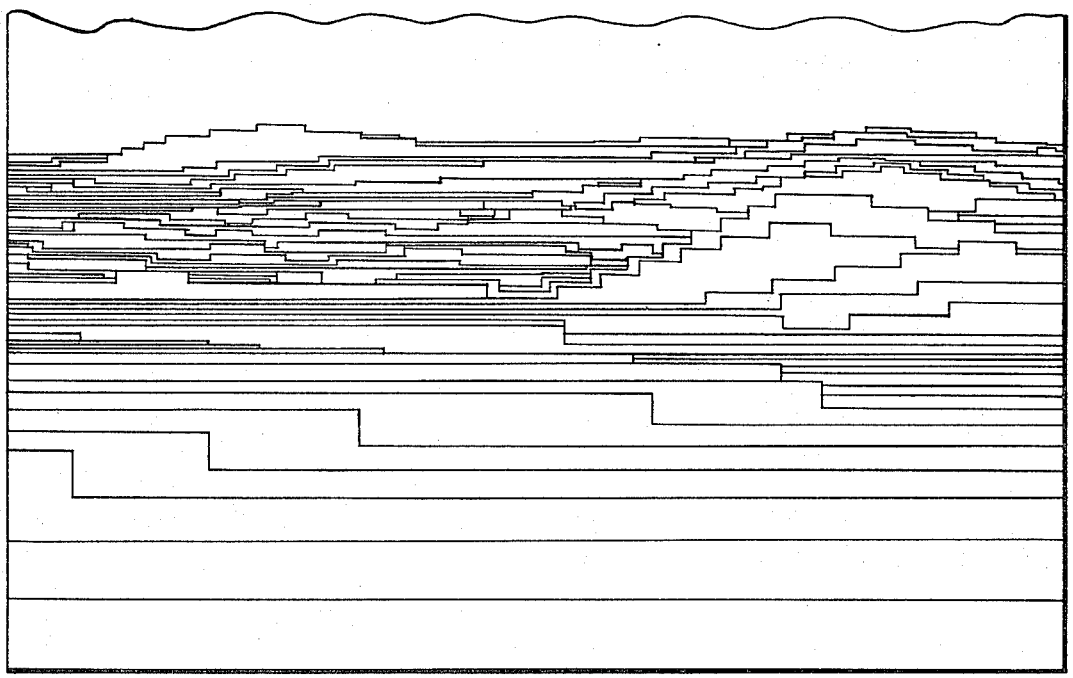
FIG. 8 shows a typical perspective display which may be derived using the apparatus of FIG. 6.
Figure 9:
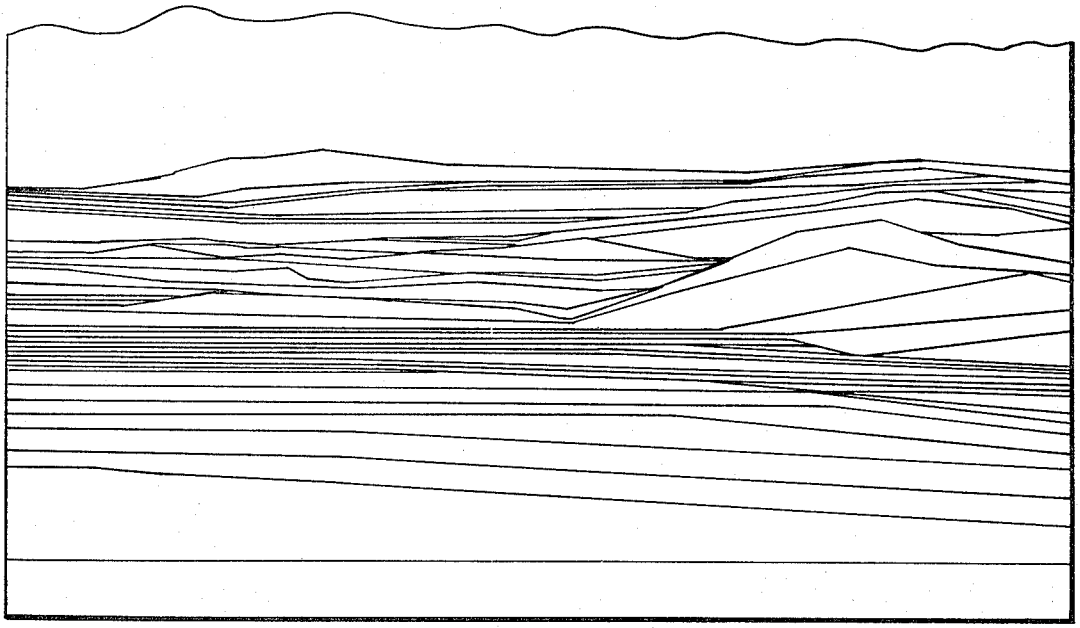
FIG. 9 shows how the display of FIG. 8 would be affected if smoothing circuitry were to be added to the apparatus of FIG. 6.

It can therefore be seen that in accordance with the teachings of the present invention there is provided a real-time dynamic perspective display of the terrain in front of an aircraft, as shown in FIGS. 8 and 9, which will closely and accurately simulate that which the pilot would see if he were to view the terrain directly. Such a display may be used for navigation at low altitudes by comparing the perspective display with the real world, for lateral terrain avoidance under low visibility conditions, for pre-mission plannning with simulated altitude and navigation inputs, and for a look-ahead in low altitude flight with an altitude bias input selection device. This feature will permit a pilot at low altitude in rough country to achieve a high altitude look at the terrain ahead without exposing his own aircraft.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:
1. Visual display apparatus for providing a perspective display of terrain from a contour map of said terrain, comprising in combination:
 (a) a contour map, color-coded in three different shades of gray, arranged on said map in a sequence so that all steps up in altitude are characterized by a single level change in the darker direction, or a two-level change from the darkest to the lightest shade and all steps down in altitude are characterized by a single level change in the lighter direction, or a two-level change from the lightest to the darkest shade;
 (b) means for sequentially scanning thru said map with a beam of light in a predetermined pattern and for providing a signal $R_t$ indicating the location of said beam with respect to said countour map;
 (c) means responsive to the light passing through said map for generating a first signal indicative of the instantaneous color of said map in the path of said light beam;
 (d) means for converting said first signal into $+\Delta h$ and $-\Delta h$ signals representing, respectively, incremental steps up and down in altitude as said map is scanned;
 (e) means responsive to said $+\Delta h$ and $-\Delta h$ signals and a signal $h_o$ indicative of the height of said aircraft above said initial position for generating a signal $h_t$ in accordance with the relation

$$h_t = h_o - \Sigma(+\Delta h) + \Sigma(-\Delta h)$$

(f) means responsive to said $h_t$ signal and said $R_t$ signal from said scanning means indicative of the instantaneous distance between said initial position and said scanning beam for generating a signal $\alpha_t$ in accordance with the relation $$\alpha_t = \tan \frac{-1 h_t}{R_t}$$

where $\alpha_t$ is equal to the instantaneous altitude angle of the point on the terrain in the path of said scanning beam;
 (g) display means having a vertical input, a horizontal input and a blanking input;
 (h) means responsive to said $\alpha_t$ signal, a signal $\theta_t$ from said scanning means indicative of the instantaneous bearing angle of a line between said initial position and the point on the terrain in the path of said scanning beam, and a pair of signals $X_o$ and $Y_o$ representing, respectively, the horizontal and vertical components of the aircraft's heading, for generating a pair of signals X and Y in accordance with the relations $X = X_o + k\theta_t$ and $Y = Y_o + k\alpha_t$, said X and Y signals being applied to the horizontal and vertical inputs, respectively, of said display means; and
 (i) means for driving said contour map as a function of the desired travel of the contour map with respect to the terrain represented in said contour map.

2. The apparatus of claim 1 and further comprising: means responsive to said $\alpha_t$ signal for applying a blanking signal to said display means whenever the instantaneous value of said $\alpha_t$ signal at a given bearing angle is less than a previous value of said $\alpha_t$ signal at said given bearing angle.

3. The apparatus of claim 1 wherein said scanning means scans back and forth across the terrain at constantly advanced positions along arcuate paths having a common center of curvature positioned at an initial position, successive scans being separated by a fixed distance $\Delta R$.

4. Apparatus for providing a real-time dynamic perspective display of the terrain on a contour map, comprising in combination:
 (a) a contour map made up of a series of equi-altitude lines so as to define a plurality of ribbons of terrain, each region characterized by a certain altitude range and wherein said contour map has consecutive ribbons of terrain colored with shades of gray and arranged on said map in a sequence so that all steps up in altitude are characterized by a single level change in the darker direction, or a two-level change from the darkest to the lightest shade and all steps down in altitude are characterized by a single level change in the lighter direction, or a two-level change from the lightest to the darkest shade;

(b) light beam scanning means for scanning said contour map from an initial position along a series of lines at increasing ranges from said initial position to provide a continuous series of profile lines and for generating a varying light output;

(c) scan generator means for controlling said light beam scanning means and for generating signals representing the instantaneous bearing angles of a line between said initial position and the points on the terrain in the path of said light beam scanning means as said countour map is scanned;

(d) means responsive to said varying light output for generating signals representing the instantaneous altitude angles of points on said terrain from a selected altitude above said initial position as said contour map is scanned;

(e) means for driving said contour map as a function of the desired travel of said initial position with respect to the terrain displayed on said contour map; and (f) means responsive to said bearing signals and said altitude signals for generating a perspective display of said terrain.

5. The apparatus of claim 4 and further comprising: means responsive to said altitude signals for applying a blanking signal to said display means whenever the instantaneous value of an altitude signal at any bearing angle is less than a previous value of the altitude signal at the same bearing angle.

6. Visual display apparatus for providing a perspective display of the terrain in front of an aircraft from a contour map of said terrain, comprising in combination:

(a) a contour map color-coded in three different shades of gray, arranged on said map in a sequence so that all steps up in altitude are characterized by a single level change in the darker direction, or a two-level change from the darkest to the lightest shade and all steps down in altitude are characterized by a single level change in the lighter direction, or a two-level change from the lightest to the darkest shade;

(b) means for sequentially scanning said map with a beam of light in a predetermined pattern and for providing a signal indicating the location of said beam with respect to said contour map;

(c) photo-sensitive means disposed to receive scanner light from said contour map and to provide a three-level signal corresponding to the level of light received;

(d) logic converter means responsive to said three-level signal from said photo-sensitive means for converting said three-level signal into a first signal when the indicated change in altitude is up and into a second signal when the indicated change in altitude is down;

(e) means for driving said contour map as a function of the travel of the aircraft with respect to the terrain represented in said contour map;

(f) summing means receiving the output from said logic converter means and adding said first signal to the previously indicated altitude signal and subtracting said second signal from the previous indicated altitude signal to provide a relative altitude signal; and (g) display means responsive to said relative altitude signal and said beam position indicating signal from said scanning means for displaying a perspective display of said terrain.

7. The apparatus of claim 6 and further comprising: means responsive to said relative altitude signal for applying a blanking signal to said display means when the instantaneous value of a relative altitude signal at any bearing angle is less than the value of a previous relative altitude signal at the same bearing angle.

References Cited

UNITED STATES PATENTS

| | | | |
|---|---|---|---|
| 3,028,684 | 4/1962 | Khanna et al. | 35—10.4 |
| 3,067,525 | 12/1962 | Thom | 35—10.4 |
| 3,067,526 | 12/1962 | Gray et al. | 35—10.4 |
| 3,113,989 | 12/1963 | Gray et al. | 35—10.4 |
| 3,131,247 | 4/1964 | Benamy et al. | 35—10.4 |
| 3,229,018 | 1/1966 | Balding et al. | 35—10.4 |
| 3,294,891 | 12/1966 | Antul et al. | 35—10.4 |
| 3,355,538 | 11/1967 | Thomas et al. | 35—10.4 |
| 3,413,402 | 11/1968 | Marrero | 35—10.4 |
| 3,439,105 | 4/1969 | Ebeling et al. | 35—10.2 |

MALCOLM A. MORRISON, Primary Examiner

FELIX D. GRUBER, Assistant Examiner

U.S. Cl. X.R.

35—12, 10.4; 235—198